United States Patent
Bouvier

[15] 3,649,089
[45] Mar. 14, 1972

[54] FLUID BEARING STRUCTURE

[72] Inventor: Anton Bouvier, Allison Park, Pa.
[73] Assignee: Owens-Illinois, Inc.
[22] Filed: May 25, 1970
[21] Appl. No.: 39,971

[52] U.S. Cl. ................................................308/9
[51] Int. Cl. ..........................................F16c 17/16
[58] Field of Search ........................308/9, 122 A; 24/5

[56] References Cited

UNITED STATES PATENTS

| 1,745,871 | 2/1930 | Spillman | 308/122 |
| 3,016,273 | 1/1962 | Benoit | 308/9 |
| 3,189,389 | 6/1965 | Heer | 308/9 |
| 3,193,334 | 7/1965 | Porath | 308/9 |
| 3,223,463 | 12/1965 | Porath | 308/9 |
| 3,368,411 | 2/1968 | Sann | 74/5 |

Primary Examiner—Edgar W. Geoghegan
Assistant Examiner—Frank Susko
Attorney—Barnes, Kisselle, Raisch & Choate

[57] ABSTRACT

A fluid bearing construction comprising of a base, a stator and a rotor. The rotor is rotatably mounted in the stator by spaced fluid bearings comprising restrictors between complementary surfaces of the rotor and stator to which fluid under pressure is supplied so that a thin film of fluid flows between the surfaces of the stator and rotor. Means are provided for mounting the stator in the base about angularly spaced axes which intersect the axis of the stator so that the stator is free to move about the angular spaced axes with respect to the base.

3 Claims, 6 Drawing Figures

Patented March 14, 1972

INVENTOR.

ANTON BOUVIER

INVENTOR.

ANTON BOUVIER

Patented March 14, 1972

INVENTOR.

ANTON BOUVIER 3,649,089

FLUID BEARING STRUCTURE

This invention relates to fluid bearing structures.

BACKGROUND OF THE INVENTION

In both machinery and scientific instruments, it is quite often desirable to support a shaft in accurate position. For example in a gimballing system, one or more shafts must be mounted upon a base to ensure the proper rotation or movement.

It has heretofore been suggested that accurate support of shafts or rotors about one or more axes can be achieved by the use of fluid bearings wherein fluid under pressure is supplied through restrictors between complementary surfaces of a shaft or rotor and a base or stator.

However any misalignment in the spaced supports or bearings prevents the fluid bearings from accurately supporting the load since any such misalignment will adversely affect the gap between the rotor and stator surfaces. Since fluid bearings are dependent upon a small a gap as possible for accuracy, any misalignment is detrimental to the performance of the bearing and can make the bearing totally inoperative. In addition nonuniform loading on the shaft caused by the lack of circular symmetry of loading on the shaft changes the deflection of the ends of the shaft in the bearings. Such a condition is present for example in a gimballing system.

Among the objects of the invention are to provide a self aligning fluid bearing construction which will automatically compensate for misalignment between the axes of the spaced bearings supporting the shaft; which bearing structure will also compensate for nonuniform circular loading on the shaft; wherein deformation caused by bearing load on the shaft will not affect the load carrying capacity of the fluid bearings; and wherein the components of the fluid bearing can be manufactured individually, economically apart from the machine or instrument on which the bearing is to be used.

SUMMARY

A fluid bearing construction comprising of a base, a stator and a rotor. The rotor is rotatably mounted in the stator by spaced fluid bearings comprising restrictors between complementary surfaces of the rotor and stator to which fluid under pressure is supplied so that a thin film of fluid flows between the surfaces of the stator and rotor. Means are provided for mounting the stator in the base about angularly spaced axes which intersect the axis of the stator so that the stator is free to move about the angular spaced axes with respect to the base.

More specifically, a supporting ring surrounds the stator and is pivoted to the base about a transverse axis and is pivoted to the stator about another transverse axis which is angularly displaced with respect to the first mentioned transverse axis.

DESCRIPTION

Figure 1:
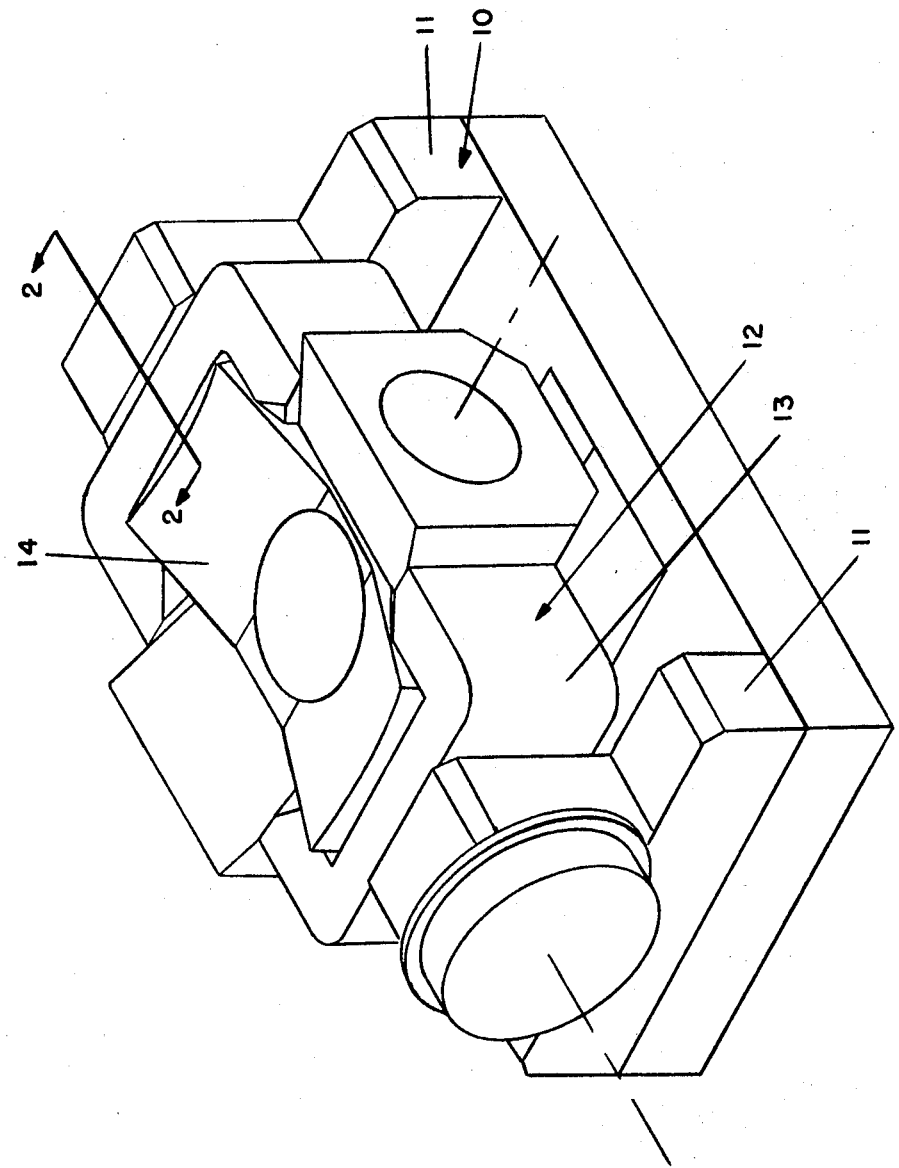
FIG. 1 is a perspective view of a instrument embodying the invention.

Referring to FIG. 1, the invention is shown as being applied to a gimballing system found in an instrument and comprises a base 10 which includes spaced pedestals 11 on which a shaft or rotor 12 supports an outer gimbal ring 13 which in turns rotatably supports the shaft or rotor of an inner gimbal ring 14 about an axis at a right angle to the horizontal.

In accordance with the invention each of the shafts or rotors of the outer and inner gimbals are mounted in stators by fluid bearings.

Figure 2:
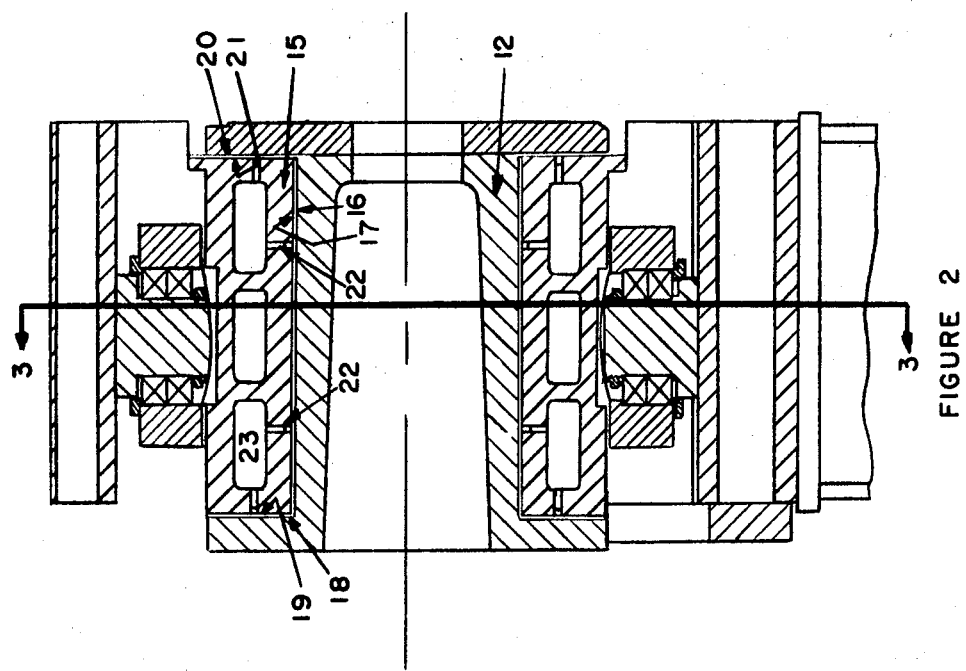
FIG. 2 is a fragmentary sectional view taken along the line 2—2 in FIG. 1.

Referring to FIG. 2 which is a sectional view through one end of the shaft or rotor 12, the shaft 12 extends into a stator 15, the rotor 12 and stator 15 having complementary cylindrical surfaces 16, 17 and radial surfaces 18, 19, 20, 21.

In accordance with fluid bearing construction restrictors 22 are provided in the surfaces 17, 19 and 21 of stator 15 and extend from a manifold chamber 23 therein to supply fluid under pressure to the gap between the surfaces 16, 17 and 18, 19 and 20, 21. In this manner the flow of fluid such as air between the surfaces maintains the end of the rotor 12 in stable accurate relationship with respect to the stator 15.

Figure 3:
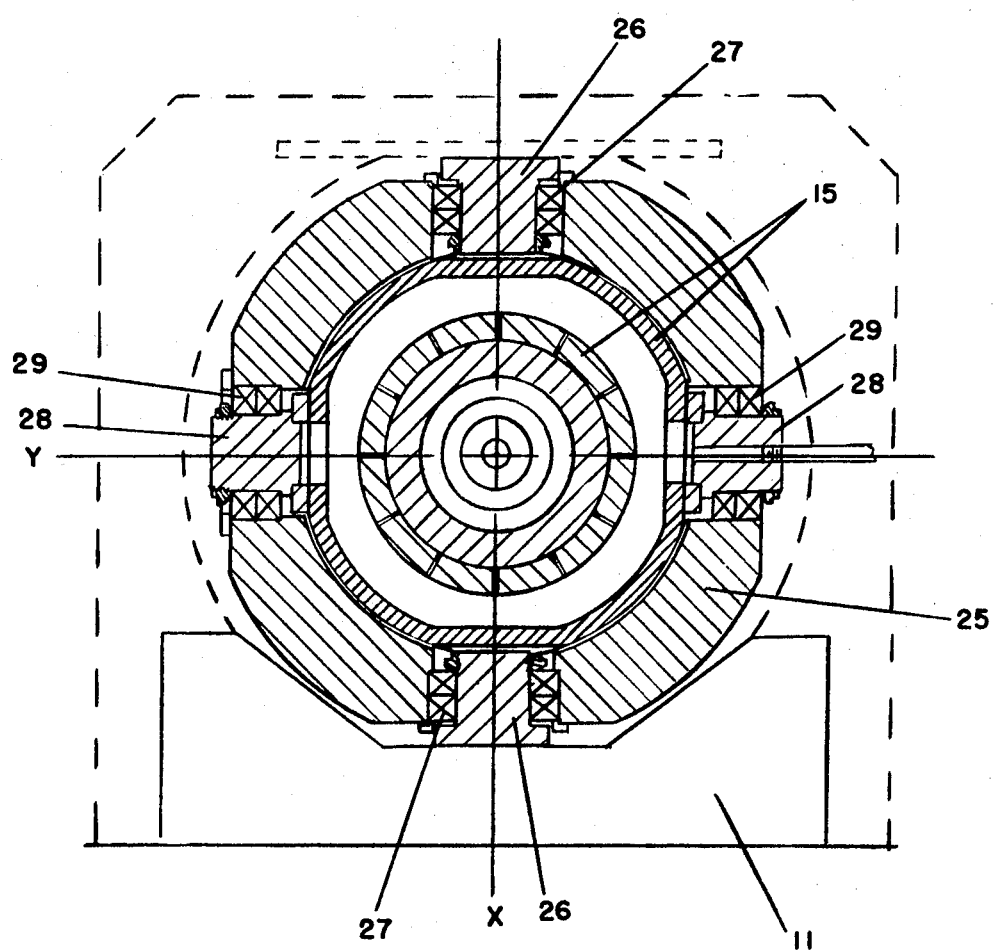
FIG. 3 is a fragmentary sectional view taken along the line 3—3 in FIG. 2.

Referring to FIGS. 2 and 3 the stator 15 is in turn rotatably mounted on the base and particularly the pedestal 11 of the base for limited rotation about angularly spaced transverse axes which intersect the axis of the stator. Specifically an annular support ring 25 is mounted for rotation about one transverse axis on the pedestal 11 by pivots 26 fixed to the pedestal 11 and extending radially inwardly and ball bearings 27 which rotatably support the support ring 25 on the pedestal 11 of base 10. The support ring 25 is further mounted for rotation about a transverse axis Y angularly spaced with respect to the first mentioned transverse axis by pivot members 28 which are fixed to the stator 15 rotatably mounted in the support ring 25 by ball bearings 29.

By this arrangement the end of the shaft 12 is free to move about the axes X and Y.

The other end of the shaft 12 is similarly mounted except that the radial thrust surfaces 18, 19, 20, 21 are omitted. The other end of the shaft is also thereby free to move about two transverse axes that are angularly displaced from one another and intersect the axis of the stator.

Figure 4:
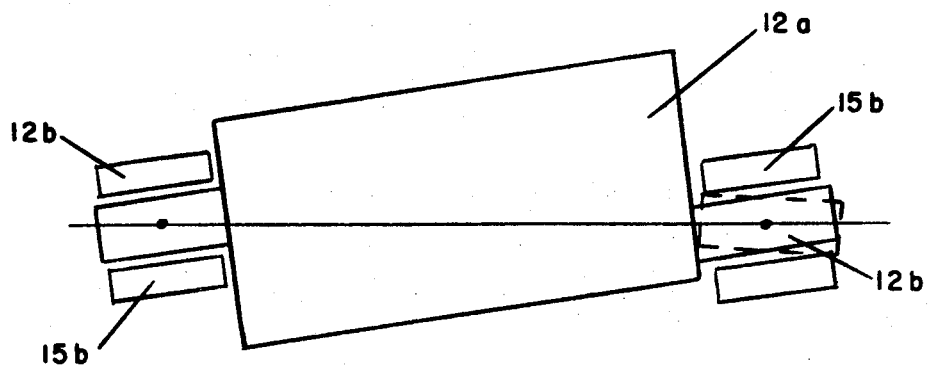
FIGS. 4-6 are schematics diagrams showing the manner in which the invention functions to produce an accurate axis of rotation for a shaft or rotor.

The manner in which the invention will function to compensate for the misalignment between the spaced bearings of the shaft can be more readily understood by reference to the diagram, FIG. 4, which shows a shaft 12a having ends 12b that are mounted in stators 15a, 15b, not axially aligned. For purposes of illustration the ends 12b are shown grossly misaligned. With the arrangement described in connection with FIGS. 1-3, each of the stators 15a, 15b is free to move as for example to the broken line positions shown in FIG. 4 and thereby accommodate for the initial misalignment between the axes of the stators.

Figure 5:
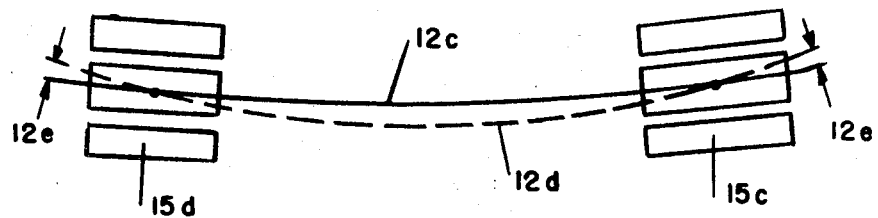

The manner in which the bearing construction embodying the invention may accommodate nonuniformity in circular loading of the shaft can be shown by reference to the schematic diagram, FIG. 5. As shown any variation in deflection of the rotor or shaft from the position 12c to the broken line position 12d will cause different movement of the ends 12e. The bearing construction will permit the stators 15c, 15d to move about transverse axis and thereby accommodate the movement of the ends 12e of the shafts. It should be understood that with reference to each of the diagrams 4 and 5, the amount of deflection or relative displacement has been exaggerated for purposes of discussion.

Figure 6:
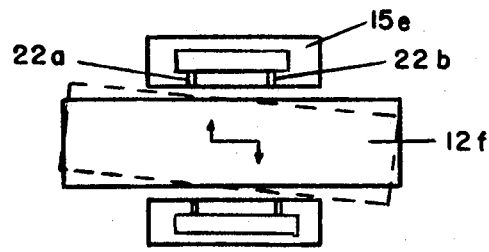

Referring to FIG. 6, the manner in which the change in position of an end of a rotor shaft causes displacement about the transverse axes can be understood with reference to the schematic diagram shown therein wherein the shaft 12f is rotatably mounted in the stator 15e. Any tendency of the axis of the shaft to change to one of the positions shown in FIGS. 4 and 5 will cause a nonuniform change in the gaps between the surfaces of the stator 15e and shaft 12f. Thus a different force will be produced for example at the circumferential row of restrictors 22a and the circumferential row of restrictors 5, 22b resulting in a force couple that will tend to move the stator 15e to an angularly related position such as shown on broken line in FIGS. 4 and 5. Thus for best results at least two rows of restrictors should be provided on cylindrical surface 17 especially in the absence of radial surfaces 19, 21.

I claim:

1. In a fluid bearing construction, the combination comprising
   a base,
   a pair of stators,
   a rotor having an axial bearing surface, and axial and radial bearing surfaces longitudinally spaced from said axial bearing surface,
   one of said stators having a complementary axial bearing surface and the other said stators having complementary axial and radial bearing surfaces,
   and means for supplying fluid under pressure to cause a thin film of fluid to flow between said surfaces to rotatably support said rotor in said stators,
   means for mounting each said stator in said base for limited rotation about angularly spaced transverse axes which intersect the axis of its respective rotor whereby each said stator is relatively free to move about said angularly spaced axes with respect to said base,
   said last-mentioned means for mounting each said stator in said base comprising a support member for each said stator,
   low friction means for pivoting each said support member to said base about one transverse axis intersecting the axis of its respective stator,
   and low friction means for pivoting each said support member to its respective stator about transverse axis angularly spaced with respect to said first-mentioned transverse axis and intersecting the axis of its respective stator whereby any axial misalignment of the spaced surfaces and nonuniformity in circular loading is compensated for so that the axis of rotation of the rotor is maintained in accurate relationship to the base.

2. The combination set forth in claim 1 wherein the angular spaced transverse axes are at a right angle to one another.

3. The combination set forth in claim 1 wherein each said support member comprises a support ring.

* * * * *